United States Patent Office 2,910,494
Patented Oct. 27, 1959

2,910,494

POLYALUMINUM OXIDE CARBOXYLATES

Jacobus Rinse, Bernardsville, N.J., assignor to J. W. Ayers & Co., Easton, Pa., a corporation of Delaware No Drawing. Application January 24, 1958
Serial No. 710,846

20 Claims. (Cl. 260—448)

This invention relates to linear polymeric aluminum oxide salts of aliphatic amino acids and hydroxy acids and to processes whereby they may be produced. More particularly it is concerned with such compounds which contain either 2 or 3 aluminum atoms joined by oxygen atoms, the remaining bonds on the aluminum atoms being joined to at least one glycinate radical or lactate radical and the rest, if any, to hydroxy radicals.

In the Krantz and Kibler Patent No. 2,480,743, it is disclosed that basic aluminum salts of water soluble salts of amino acids including glycine, alanine, lysine, glutamic acid and arginine constitute antacids and that they may be produced by first dissolving the amino acid in water with the aid of heat and introducing an alcoholic solution of an aluminum alcoholate thereinto, the proportions of the reactants being in the molar ratio of the aluminum compound:aminoacid:water of 1:1.1–3 or more:2–10, whereupon precipitation of dihydroxy aluminum aminoacylate occurs. The preferred compound is said to be dihydroxy aluminum glycinate, determined to possess an acid binding value of 152.7.

An object of the present invention is to provide compounds possessing higher acid binding values. Another object is to provide superior antacids for medicinal use which can be successfully employed through oral administration to neutralize stomach acids. An additional object is to provide buffering agents for use in various industrial processes. Yet another object is to produce a new class of anti-perspirants.

Broadly defined the instant invention may be said to relate to the production of a class of new linear polymeric aluminum oxide glycinates and lactates, and hydroxy glycinates and hydroxy lactates. The process for the production of these compounds involves adding glycine or lactic acid to an aluminum alcoholate of a lower molecular alcohol in the presence of water and a lower molecular alcohol solvent to provide a reaction mass in which the aluminum compound, the acid compound and the water are present in the molar ratio of 6:2–10:4–12, the mixture being heated to a temperature above about 80° C. until the reaction has gone to completion which point is indicated by the cessation of alcohol liberation.

For producing the linear polymeric aluminum oxide hydroxy acylates, only part of the water ultimately needed is initially included in the reaction mixture. To attain the trimeric aluminum compounds, only four mols of water are initially mixed with the six mols of the aluminum compound, and for producing the dimeric compounds only three mols of water are initially present. In both instances the initial reaction mass is heated and reacted until no more alcohol is liberated and when this stage is reached, the remaining amount of the water required is added and reacted, thereby ultimately providing the desired hydroxy acylate polymeric aluminum compound.

The aluminum alcoholates employed in the process of the present invention can be produced from lower molecular alcohols and in particular from ethyl, propyl and butyl alcohols, either of the normal or iso structure. Through the use of alcoholate derivatives of these low boiling point alcohols, the aluminum compounds finally produced can be obtained in a condition substantially free of side products, for these alcohols which are regenerated may be volatilized from the reaction mass without causing decomposition of the aluminum compounds produced.

The alcohol solvent employed in the reaction mass to facilitate the reaction can be and preferably is the same as the alcohol of the aluminum alcoholate initially employed. When the alcohols are the same, only one alcohol need be recovered from the reaction mass and this alcohol can be re-employed to produce more aluminum alcoholate and to provide the solvent for succeeding production.

In carrying out the process of the present invention, the reaction mass should be heated to a temperature of from about 80° C. up to 90°–170° in order to obtain the best results. At temperatures below 80° C., the removal of the alcohol from the reaction mass is too difficult and at temperatures above the stated range, the aluminum compound will decompose, which result is indicated by a color change which takes place in the reaction mass. Under the preferred operating procedure, the aluminum alcoholate in alcoholic solution is preliminarily preheated and the temperature is maintained or increased to the highest level predetermined to be below that at which a color change will occur in the reaction mass.

The heating of the reaction mass is continued until liberation of alcohol by the reaction ceases. When all of the alkoxy groups have been removed and the trimer is formed, nine mols of alcohol, have been liberated per mol of the trimer formed, and in formation of the dimer, it is six mols liberated. The first stage reaction is preferably carried out during refluxing in order to retain the alcohol in the reaction mass until the polymerization or condensation goes to completion.

In order to produce the novel compounds of the invention, a specific manner of bringing the reactants together is generally required. This effective procedure involves adding the glycine or lactic acid with water in the alcohol solvent to a mixture of the aluminum alcoholate and with more of the alcohol solvent.

When the hydroxy glycinates and lactates of the present invention are to be produced, the aluminum alcoholate, the acid and the water are first brought together and reacted in the molar ratio of 6:2–6:3–4. When the liberation of alcohol ceases, an additional 4–9 mols of water are added and the heating and reacting are resumed and continued until no more alcohol is liberated, the alcohol being ultimately vaporized off preferably with the aid of reduced pressure.

When the products being produced are trimeric aluminum oxide hydroxy glycinates or lactates, the aluminum alcoholate, the acid and the water are first reacted in the molar ratio of 6:2–6:4 and after this reaction has been completed an additional 4–8 mols of water are added, the heating being continued until the reaction goes to completion.

When the product desired is the dimeric aluminum oxide hydroxy glycinate or lactate, the aluminum alcoholate, acid and water are brought together initially and reacted in the molar ratio of 6:3–6:3 and after this reaction goes to completion 6–9 additional mols of water are added, the reaction being continued until the reaction goes to completion.

*Example 1*

To 612 gm. of aluminum isopropoxide in 400 cc. of isopropanol in a refluxing vessel, there is added a suspension of 75 gm. of glycine in 600 cc. of isopropanol mixed with 36 gm. of water, the latter being at 85° C. The temperature of the mixture is kept at the said temperature for 30 minutes at which time 36 gm. of water dissolved in 200 cc. of isopropanol are added. After an additional 30 minutes of reaction, an equal amount of water is added. After 30 minutes more of reaction, the liberated alcohol and alcohol solvent are removed by distillation finally under vacuum at temperatures approaching but not exceeding 120° C.

The product obtained is linear tetrahydroxy trimeric aluminum oxide monoglycinate of the formula

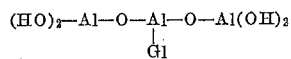

wherein the Gl (as in the remaining examples) means the glycinate radical.

The yield of the above product, a white odorless fine powder, is 255 gm., this yield being slightly below the theoretical yield of 260 gm., the difference being due primarily to the loss of some of the powder in the drying or evaporation process. This product has an acid binding value corresponding to 270 ml. of a 0.1 normal hydrochloric acid per gm. of the product.

*Example 2*

Three hundred and six grams of aluminum isopropoxide were mixed with 300 cc. of isopropanol and heated to 80° C. Thereupon a slurry consisting of 112.5 gm. of glycine and 18 gm. of water in 300 cc. of isopropanol was slowly introduced into the hot solution. The temperature of the reaction mass was maintained at 80° C. for a period of 30 minutes under agitation and reflux. Then a solution of 18 gm. of water in 50 cc. of isopropanol was added and the agitation and heating under reflux was continued for an additional three hours. Finally the isopropanol liberated by the reaction and that introduced as the solvent was distilled off under vaccum at a final temperature of 170° C. The product, linear dihydroxy trimeric aluminum oxide triglycinate, was obtained in the form of a very fine powder possessing the formula

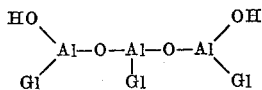

The yield of the above product was 179 gm., the calculated yield being 184 gm. Its acid binding power was 210.

*Example 3*

Three hundred and six grams of aluminum isopropoxide were mixed with 300 cc. of isopropanol and heated to 80° C. Next a slurry consisting of 187.5 gm. of powdered glycine and 18 gm. of water in 300 cc. of isopropanol was slowly introduced. The temperature was maintained at 80° C. and the reaction mass was stirred under reflux for a period of 3 hours. Thereupon the isopropanol present was distilled off under vacuum, the temperature being maintained below 90° C. thereby preventing decomposition. The product obtained, linear trimeric aluminum oxide pentaglycinate, was in the form of very fine powder and was of the following constitution

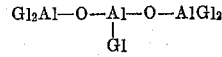

The yield of the above product was slightly under the calculated yield of 242 grams.

*Example 4*

To 204 gm. of aluminum isopropoxide in 150 cc. of isopropanol there is added a suspension of 37.5 gm. of glycine in 200 cc. of isopropanol mixed with 9 gm. of water, at 85° C. The temperature is maintained at this level during stirring under reflux and after 30 minutes an additional 27 gm. of water dissolved in 75 cc. of isopropanol is added. After 3 hours of heating under these conditions all the alcohol present is evaporated off under vacuum at a temperature not exceeding 100° C. The product obtained is linear trihydroxy dimeric aluminum oxide mono-glycinate of the formula

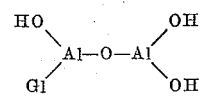

*Example 5*

To 204 gm. of aluminum isopropoxide in 150 cc. of isopropanol there is added at 85° C. a slurry of 75 gm. of glycine in 600 cc. of isopropanol containing 9 gm. of water. After heating and stirring under reflux for a period of 30 minutes, an additional 18 gm. of water dissolved in 100 cc. of isopropanol is added. After 3 hours under these conditions all of the alcohol present is distilled off finally under vacuum at a temperature below about 100° C. The product obtained is linear dihydroxy dimeric aluminum oxide diglycinate of the formula

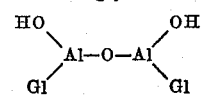

A substantially quantitative yield is obtained.

In the processes defined in the foregoing examples, lactic acid can be substituted for the glycine in whole or in part, the same mol ratios being employed. The reactions which take place will proceed in the same manner, producing in each instance lactates corresponding to the glycinates. The lactates are particularly effective as antiperspirants.

The trimeric and dimeric structural forms of the aluminum compounds of the present invention are evidenced by (1) the proportions of the reactants brought together, (2) the yields of the respective aluminum compounds and (3) the agreement between the number of mols of alcohol recovered from the reaction and the number of mols of alcohol liberatable from the aluminum alcoholate which alcohol is, of course, in addition to the alcohol solvent introduced into the reaction mass.

The different acid binding values of the compositions of the present invention in relation to that of the dihydroxy aluminum glycinate of the prior art shows that applicant's compounds do not have the simple structure of the known compound. The superior acid binding value of most of the new compounds is apparently due to the depolymerization of the compositions of the present invention during use, whereby an increased proportion of acid binding hydroxy groups per aluminum atom is made available for binding the acid.

It should be understood that the present invention is not limited to the exact details as to procedures, conditions and reactants herein disclosed but that it extends to all equivalents which will occur to those skilled in the art upon consideration of the scope of the terms set forth in the appended claims.

I claim:

1. A process for the production of linear polymeric aluminum oxide glycinates and lactates, hydroxy glycinates and hydroxy lactates which comprises, adding an acid compound selected from the group consisting of glycine and lactic acid to an aluminum alcoholate of a lower molecular alcohol in the presence of water and an alcohol solvent vaporizable from the product to be formed without decomposing the same; the aluminum compound, the acid compound and the water being brought together in the molar ratio of 6:2–10:4–12, reacting the resulting mixture at a temperature above about 80° C. but below the decomposition temperature of the product formed, until the liberation of alcohol ceases.

2. A process for the production of linear polymeric aluminum oxide glycinates and hydroxy glycinates having a linear chain of 2–3 aluminum atoms joined by oxygen which comprises, adding glycine to an aluminum alcoholate of a lower molecular alcohol in the presence of water and a lower molecular alcohol solvent; the aluminum compound, the glycine and the water being brought together in the molar ratio of 6:2–10:4–12, reacting the resulting mixture at a temperature above about 80° C. but below the decomposition temperature of the product formed, until the liberation of alcohol ceases.

3. A process for the production of linear polymeric aluminum oxide glycinates and hydroxy glycinates having a linear chain of 2–3 aluminum atoms joined by oxygen which comprises, adding glycine in an alcohol solvent to a mixture of an aluminum alcoholate of a lower molecular alcohol with water and an alcohol solvent, said solvent being volatilizable at a temperature below the decomposition temperature of the product to be formed; the aluminum compound, the glycine and the water being brought together in the molar ratio of 6:2–10:4–12, reacting the resulting mixture at a temperature above about 80° C. but below the decomposition temperature of the product formed, until the liberation of alcohol ceases.

4. A process for the production of linear polymeric aluminum oxide hydroxy glycinates which comprises, adding glycine to an aluminum alcoholate of a lower molecular alcohol in the presence of water and a lower molecular alcohol solvent; the aluminum compound, the glycine and the water being brought together in the molar ratio of 6:2–6:3–4, reacting the resulting mixture at a temperature above about 80° C. but below the decomposition temperature of the product formed, until the liberation of alcohol ceases, thereby forming the hydroxy glycinate.

5. A process for the production of linear polymeric aluminum oxide glycinates and hydroxy glycinates having a linear chain of 2–3 aluminum atoms joined by oxygen which comprises, adding glycine to an aluminum alcoholate of a lower molecular alcohol in the presence of water and a lower molecular alcohol solvent; the aluminum compound, the glycine and the water being brought together in the molar ratio of 6:2–6:4, reacting the resulting mixture at a temperature above about 80° C. but below the decomposition temperature of the product formed, until the liberation of alcohol ceases, adding 4–8 additional mols of water and again reacting the resulting mixture at a temperature above about 80° C. but below the decomposition temperature of the product formed, until the liberation of alcohol ceases.

6. A process for the production of linear trimeric aluminum oxide glycinates and hydroxy glycinates which comprises, adding glycine to an aluminum alcoholate of a lower molecular alcohol in the presence of water and a lower molecular alcohol solvent; the aluminum compound, glycine and the water being brought together in the molar ratio of 3:$a$:$b$, wherein $a$ is an odd number of 1–5 and $b$ is an even number of 2–6, and $a$ and $b$ equals 7, reacting the resulting mixture at a temperature above about 80° C. but below the decomposition temperature of the product formed, until the liberation of alcohol ceases.

7. A process for the production of linear dimeric aluminum oxide hydroxy glycinates which comprises, adding glycine to an aluminum alcoholate of a lower molecular alcohol in the presence of water and a lower molecular alcohol solvent; the aluminum compound, the glycine and the water being brought together in the molar ratio of 6:3:3, reacting the resulting mixture at a temperature above about 80° C. but below the decomposition temperature of the product formed, until the liberation of alcohol ceases, adding 6–9 additional mols of water and again reacting the resulting mixture at a temperature above about 80° C. but below the decomposition temperature of the product formed, until the liberation of alcohol ceases, thereby forming the said hydroxy glycinates.

8. A process for the production of linear tetrahydroxy trimeric aluminum oxide mono-glycinate which comprises, adding glycine to an aluminum alcoholate of a lower molecular alcohol in the presence of water and a lower molecular alcohol solvent; the aluminum compound, the glycine and the water being brought together in the ratio of 6:2:12, reacting the resulting mixture at a temperature above about 80° C. but below the decomposition temperature of the product formed, until the liberation of alcohol ceases.

9. A process for the production of linear dihydroxy trimeric aluminum oxide tri-glycinate which comprises, adding glycine to an aluminum alcoholate of a lower molecular alcohol in the presence of water and a lower molecular alcohol solvent; the aluminum compound, the glycine and the water being brought together in the ratio of 6:6:8, reacting the resulting mixture at a temperature above about 80° C. but below the decomposition temperature of the product formed, until the liberation of alcohol ceases.

10. A process for the production of linear trimeric aluminum oxide penta-glycinate which comprises, adding glycine to an aluminum alcoholate of a lower molecular alcohol in the presence of water and a lower molecular alcohol solvent; the aluminum compound, the glycine and the water being brought together in the ratio of 6:10:4, reacting the resulting mixture at a temperature above about 80° C. but below the decomposition temperature of the product formed, until the liberation of alcohol ceases.

11. A process for the production of linear trihydroxy dimeric aluminum oxide mono-glycinate which comprises, adding glycine to an aluminum alcoholate of a lower molecular alcohol in the presence of water and a lower molecular alcohol solvent; the aluminum compound, the glycine and the water being brought together in the ratio of 6:3:12, reacting the resulting mixture at a temperature above about 80° C. but below the decomposition temperature of the product formed, until the liberation of alcohol ceases.

12. A process for the production of linear dihydroxy dimeric aluminum oxide diglycinate which comprises, adding glycine to an aluminum alcoholate of a lower molecular alcohol in the presence of water and a lower molecular alcohol solvent; the aluminum compound, the glycine and the water being brought together in the ratio of 6:6:9, reacting the resulting mixture at a temperature above about 80° C. but below the decomposition temperature of the product formed, until the liberation of alcohol ceases.

13. A process for the production of linear tetrahydroxy trimeric aluminum oxide mono-glycinate which comprises, adding glycine to an aluminum alcoholate of a lower molecular alcohol in the presence of water and a lower molecular alcohol solvent; the aluminum compound, the glycine and the water being brought together in the ratio of 6:2:4, reacting the resulting mixture at a temperature above about 80° C. but below the decomposition temperature of the product formed, until the liberation of alcohol ceases, adding 8 additional mols of water and again reacting the resulting mixture at a temperature above about 80° C. but below the decomposition temperature of the product formed, until the liberation of alcohol ceases.

14. A process for the production of linear dihydroxy trimeric aluminum oxide tri-glycinate which comprises, adding glycine to an aluminum alcoholate of a lower molecular alcohol in the presence of water and a lower molecular alcohol solvent; the aluminum compound, the glycine and the water being brought together in the ratio of 6:6:4, reacting the resulting mixture at a temperature above about 80° C. but below the decomposition temperature of the product formed, until the liberation of alcohol ceases, adding 4 additional mols of water and again reacting the resulting mixture at a temperature above about 80° C. but below the decomposition temperature of the product formed, until the liberation of alcohol ceases.

15. A process for the production of linear polymer aluminum oxide glycinates and hydroxy glycinates having a linear chain of 2-3 aluminum atoms joined by oxygen which comprises, adding glycine to an aluminum alcoholate of a lower molecular alcohol in the presence of water and a lower molecular alcohol solvent; the aluminum compound, the glycine and the water being brought together in the molar ratio of 6:2–10:4–12, reacting the resulting mixture at a temperature above about 80° C. but below the decomposition temperature of the product formed, until the liberation of alcohol ceases, and evaporating off from the glycinate compound formed the liberated alcohol corresponding to the alcoholate used and as well the alcohol used as a solvent.

16. Linear tetrahydroxy trimeric aluminum oxide monocarboxylate, the carboxylate group being selected from the group consisting of glycinate and lactate.

17. Linear dihydroxy trimeric aluminum oxide tricarboxylate, the carboxylate group being selected from the group consisting of glycinate and lactate.

18. Linear trimeric aluminum oxide penta-carboxylate, the carboxylate group being selected from the group consisting of glycinate and lactate.

19. Linear trihydroxy dimeric aluminum oxide monocarboxylate, the carboxylate group being selected from the group consisting of glycinate and lactate.

20. Linear dihydroxy dimeric aluminum oxide dicarboxylate, the carboxylate group being selected from the group consisting of glycinate and lactate.

References Cited in the file of this patent
UNITED STATES PATENTS

| | | |
|---|---|---|
| 2,480,743 | Krantz et al. | May 3, 1946 |
| 2,744,074 | Theobald | May 1, 1956 |